United States Patent [19]

Welles, II et al.

[11] Patent Number: 4,646,151

[45] Date of Patent: Feb. 24, 1987

[54] TELEVISION FRAME SYNCHRONIZER WITH INDEPENDENTLY CONTROLLABLE INPUT/OUTPUT RATES

[75] Inventors: Kenneth B. Welles, II, Schenectady; Robert J. Wojnarowski, Ballston Lake; Charles W. Eichelberger, Schenectady, all of N.Y.

[73] Assignee: General Electric Company, Schenectady, N.Y.

[21] Appl. No.: 697,601

[22] Filed: Feb. 1, 1985

[51] Int. Cl.[4] .................. H04N 5/04; H04N 9/64
[52] U.S. Cl. .................. 358/149; 358/148; 358/31
[58] Field of Search .................. 358/148, 149, 31, 153

[56] References Cited

U.S. PATENT DOCUMENTS

| | | | |
|---|---|---|---|
| 4,134,131 | 1/1979 | Hopkins, Jr. | 358/149 |
| 4,445,135 | 4/1984 | Heitmann et al. | 358/149 |
| 4,599,650 | 7/1986 | Wilkinson | 358/148 |

Primary Examiner—Michael A. Masinick
Assistant Examiner—Robert M. Bauer
Attorney, Agent, or Firm—Marvin Snyder; James C. Davis, Jr.

[57] ABSTRACT

A frame synchronizer having broad applicability in television systems is particularly adapted for use in a chrominance time-compressed, luminance bandwidth reduced television system. The frame synchronizer, which separates the composite video signal into its component parts and thereby minimizes the dynamic range required to digitize the signal, demodulates the chrominance signal into its quadrature components and separates the luminance signal. The synchronization signal in the composite video signal generates slave distribution signals and slave horizontal and vertical addresses. The separated chrominance quadrature components and the luminance signal are digitized and, along with the slave distribution signals and the slave horizontal and vertical addresses, are temporarily stored in first-in, first-out memories which provide independent buffering and thereby accommodate a high degree of mismatch between master and slave timing. The chrominance and luminance data are accumulated in distribution registers and transferred to write registers which provide the data input to a frame buffer memory. Master distribution and master horizontal and vertical addresses are generated from a master synchronization signal along with write and read control signals. The data in the write register is read into the frame buffer memory at the slave horizontal and vertical addresses in response to the write control signal, and data in the frame buffer memory is read out from the master horizontal and vertical addresses in response to the read control signal, converted to analog signals, and combined to form a composite signal.

8 Claims, 4 Drawing Figures

TELEVISION FRAME SYNCHRONIZER WITH INDEPENDENTLY CONTROLLABLE INPUT/OUTPUT RATES

CROSS-REFERENCE TO RELATED APPLICATIONS

This application discloses subject matter which is related to the subject matter disclosed in the following copending and commonly assigned applications to commonly assigned U.S. Patents:

U.S. Pat. No. 4,533,460 Tiemann, Cutler and Welles for "System for Encoding and Decoding Video Signals";

U.S. Pat. No. 4,533,936 issued to Tiemann and Engeler for "System for Encoding and Decoding Video Signals";

Ser. No. 697,535 filed concurrently herewith by Eichelberger and Wojnarowski for "Chrominance Time-Compressed, Luminance Bandwidth-Reduced Television System";

Ser. No. 697,600 filed concurrently herewith by Eichelberger, Wojnarowski and Mihran for "Sharpness Enhanced Equal Bandwidth Luminance Bandwidth Compression System";

Ser. No. 697,560 filed concurrently herewith by Wojnarowski and Eichelberger for "Alternate Field Luminance Enhancement in a Spectrum Conserving Television System".

The disclosures of the foregoing copending patent applications are incorporated herein by reference.

BACKGROUND OF THE INVENTION

The present invention generally relates to a frame synchronizing method and apparatus for use in a television system in which the input and the output sampling rate is locked to the timing pulses associated with a master signal. The invention has broad application in television systems in general and, in particular, may be advantageously used in the chrominance time-compressed, luminance bandwidth-reduced television system disclosed in copending application Ser. No. 697,535.

Frame synchronizers are of general use in television systems whenever an incoming signal has synchronization timing which does not match the master timing of the system. This is the case, for example, when a remote broadcast is received at the broadcasting studio. Frame synchronization is necessary so that the vertical intervals of the master and remote signals coincide in time. Otherwise, switching from master to remote will cause a change in the position of the vertical interval and the image produced by television receivers receiving the signal from the studio will undergo a vertical roll. Devices such as video disk players and video tape players also require time base correction in order to provide a completely standard signal to the television system.

The chrominance time-compressed, luminance bandwidth reduced television system disclosed an application Ser. No. 697,535 also requires frame synchronization. In that system, the chrominance information is transmitted in time-compressed form during the normal horizontal retrace time. Chrominance information for a given program is transmitted once every other line, with chrominance information for a second program occupying the unused alternate line positions. Luminance information for both programs is transmitted during the active video time for each line. This is done by modulating one program on the main carrier and modulating the second program on a subcarrier approximately 4.5 MHz removed from the main carrier. Consider that the horizontal retrace in the signals for both transmitted programs must occur coincidently such that chrominance for one picture or the other can be sent during the horizontal retrace interval and the luminance information for both signals can be combined and transmitted simultaneously. Any timing misalignment would cause at least some of the luminance information from the picture in one program to be present with at least some of the chrominance in the picture for the other program. It is also necessary to synchronize the vertical intervals of both pictures so that they occur simultaneously because special processing must be allowed during the vertical interval. For example, during the vertical interval, a signal is transmitted which represents a zero or black level associated with the chrominance and luminance of each picture. Also, vertical interval reference (VIR) signals are transmitted during the vertical interval, typically on line 19 of the frame. The VIR signals are used to control the phase of an oscillator and the gain of an amplifier in order to maintain color accuracy and saturation in the picture produced by the television receiver. Further information on this system may be had by reference to U.S. Pat. No. 3,950,780 issued to Harry T. Freestone for "VIR Chroma System" and assigned to the instant assignee. Since the vertical interval is different in format, it cannot be present at the same time as luminance and chrominance information for either picture. This requires that the vertical intervals for both pictures coincide in time.

SUMMARY OF THE INVENTION

It is therefore an object of the present invention to provide an exact match between vertical timing rates for two video sources, and between horizontal timing rates for the two video sources, such that switching between the two sources can be accomplished without disturbing the synchronization in a television system.

It is another object of this invention to provide horizontal and vertical match between the signals for two simultaneously transmitted television programs occupying a common bandwidth, such that objectionable interference between the two programs is eliminated.

Yet another object of the invention is to provide a television frame synchronizer whose output signal is inherently phased to produce a resultant chrominance subcarrier which is locked to a master signal.

A further object of the invention is to provide a television frame synchronizer which can accommodate a high degree of mismatch between master and slave horizontal timing.

According to the invention, the method used involves clocking data representative of luminance and chrominance information from a slave signal into a first-in, first-out (FIFO) memory. The data clock rate is locked to the timing pulses associated with the slave signal. In addition to luminance and chrominance data, an address representative of each pixel position is also clocked into the FIFO memory. The FIFO memory is unloaded under control of a clock locked to the timing of a master signal, and the address for luminance and chrominance for each pixel is used to address a frame store memory. During alternate cycles, the frame store memory is written as described above or read using addresses which define the pixel position of the master.

The present invention enjoys two distinguishing advantages over known prior art. First is the separation of the chrominance information into B-Y and R-Y components before entry into a frame buffer memory, with subsequent remodulation of the B-Y and R-Y components when data is read from the frame buffer memory. The second distinguishing advantage is the use of the FIFO memory to provide a high degree of independent buffering between different input rates due to the slave timing and output rates due to the master timing. In known prior art frame synchronizer systems, the entire composite chrominance and luminance is sampled and stored in a frame buffer memory. Since the composite video signals for two programs includes the sum of luminance and chrominance information, a larger dynamic range is required to accommodate the composite signal than either the luminance or chrominance signals separately. Analog-to-digital (A/D) converters available for operation at the sampling speed associated with video signals are limited to seven or eight bits of dynamic range. The seven bit devices are often one-tenth the cost of the eight bit devices for otherwise equivalent performance. The problem is then to provide a frame synchronizing method which limits the requirements for dynamic range of the sampled signals. In addition, when the composite of the luminance and chrominance signals is read out of the frame buffer memory and converted to analog form, the chrominance frequency and phase will still be that of the slave signal even though the synchronizing pulses will coincide with the master signal sync timing. This causes an instantaneous shift in the video signal color burst frequency when switching from the master signal to the slave signal after the frame synchronizing processing. More importantly, if the slave signal was originally unphased, then the output signal of the frame synchronizer will be unphased. An unphased signal is one where the chroma subcarrier is not locked to the horizontal line rate. It would be desirable, therefore, to provide a frame synchronizer system which inherently results in a chroma subcarrier locked to the master signal and inherently corrects for unphased video signals.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE INVENTION

Figure 1:
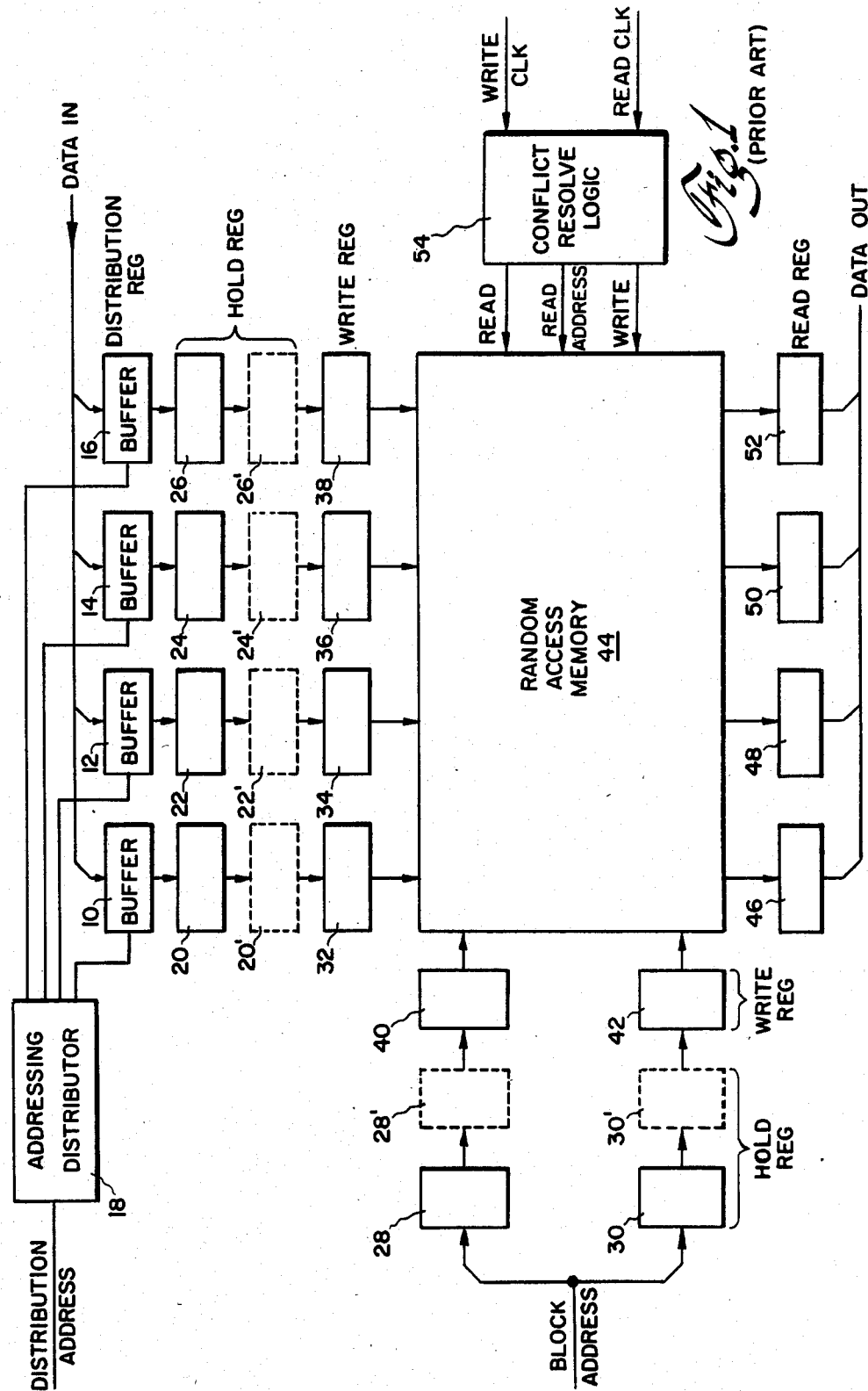
FIG. 1 is a block diagram illustrating a typical prior art frame synchronizer.

In order to better appreciate the advantages of the invention, a brief description of a typical frame synchronizer is first provided wtih reference to FIG. 1 of the drawings. Data is sampled at rates governed by the horizontal synchronizing pulses associated with a slave signal. Data is read out of the frame buffer memory at rates associated with the master timing sync, and the master and slave timing rates can be different. In the prior art system shown in FIG. 1, luminance and chrominance data is distributed in a linear addressing sequence among buffer registers 10, 12, 14 and 16 under the control of an addressing distributor 18 to form a block of data. The parallel block of data and the address of that block of data are transferred to at least another set of registers 20, 22, 24 and 26 for data and 28 and 30 for block address. Registers 20, 22, 24, 26, 28 and 30 are known as holding registers. If a second set of holding registers 20', 22', 24', 26', 28', and 30' is employed, they are connected as shown dotted in FIG. 1. Finally, the block of data in the holding registers 20, 22, 24 and 26, or 20', 22', 24', and 26' (if used), is transferred again to a set of registers 32, 34, 36 and 38, respectively, known as the write registers. When data is transferred from the holding registers 20, 22, 24 and 26, or 20', 22', 24', and 26' if used, to write registers 32, 34, 36 and 38, the address of that data is transferred from block address registers 28 and 30, or 28' and 30' (if used), to write registers 40 and 42, respectively. Equal ranks of data and address registers are required to prevent loss of address information.

Data is read out of frame buffer random access memory (RAM) 44 and into read registers 46, 48, 50 and 52 to provide synchronized data out. At least triple buffering is required in order to resolve the inevitable conflict between the differing read and write rates to the same memory. The buffering provided allows the frame buffer memory 44 to be read and written on alternate cycles governed by the timing rate of the master timing signal. A problem occurs when the master and slave timing signals differ substantially over a horizontal line interval. In order to prevent loss of data, additional ranks of hold registers, as indicated in dotted lines in FIG. 1, must be provided along with suitable conflict resolving logic 54. The conflict resolving logic provides sequential read addresses to the random access memory as well as providing alternate read and write control signals locked to the master timing. An example of a prior art frame synchronizer is the Model 2525 synchronizer by Microtime.

Figure 2:
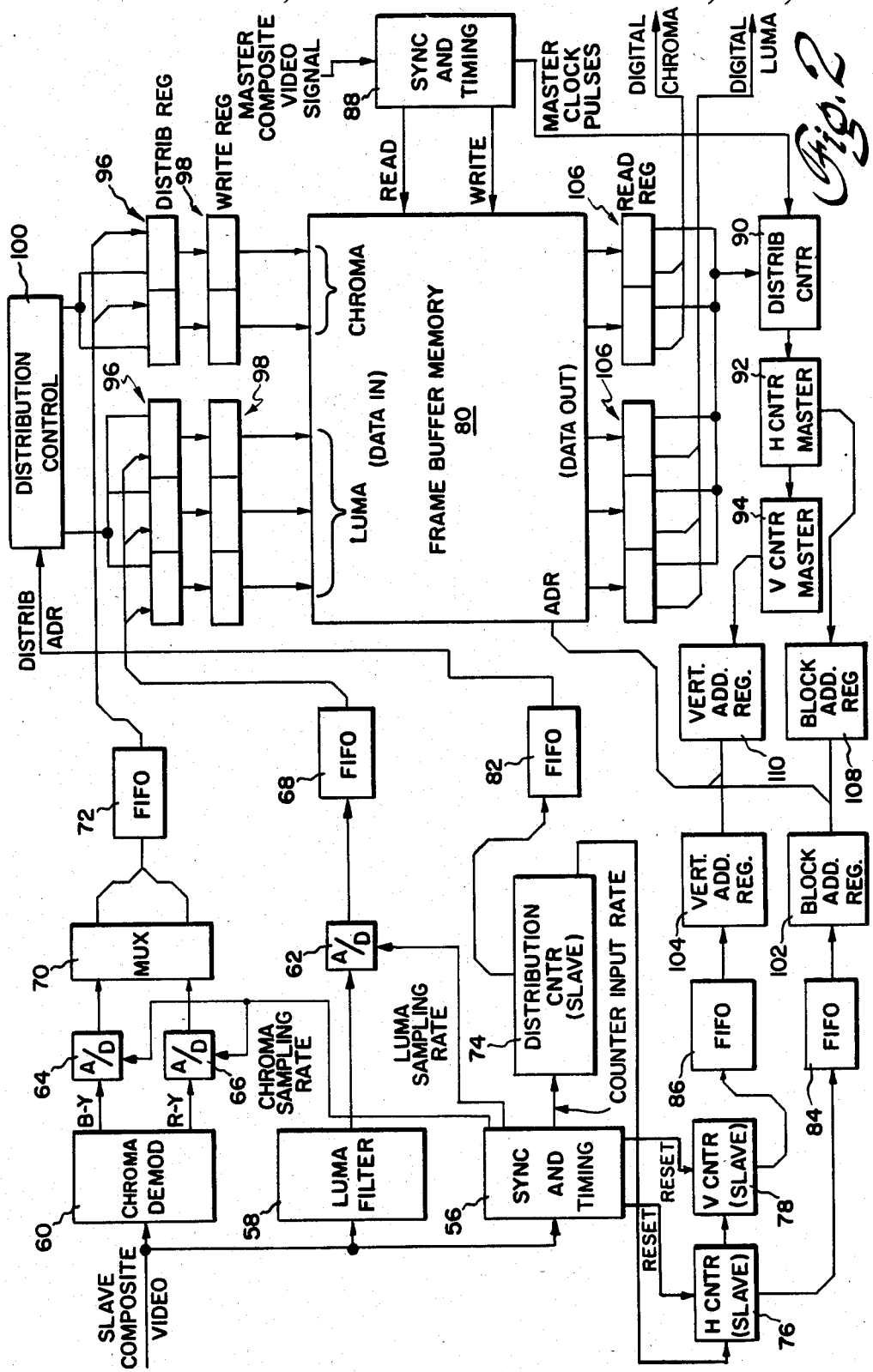
FIG. 2 is a block diagram of the frame synchronizer according to the present invention.

Turning now to FIG. 2, there is shown the frame synchronizer according to the invention. Composite video from the slave signal is supplied to a sync and timing circuit 56, a luminance filter 58 and a chrominance demodulator 60. The sync and timing circuit 56 determines horizontal and vertical timing as well as developing a high speed clock signal synchronized to the slave timing. The slave composite video signal supplied to the chrominance demodulator 60 is demodulated into B-Y and R-Y quadrature components. The slave composite video supplied to the luminance filter 58 is stripped of the sync pulses and filtered to separate the luminance information, without sync and chrominance, from the composite video. Where full bandwidth luminance is required, a conventional comb filter is used, and where band limited luminance is acceptable, a low pass filter with a cutoff below three megahertz is used. The three components, luminance, B-Y and R-Y, are sampled and converted to digital output signals by analog-to-digital (A/D) converters 62, 64 and 66, respectively, at rates controlled by the sync and timing circuit 56. The digital data thus formed in the luminance path is supplied directly to the input of a FIFO memory 68. In order to conserve memory data space, the B-Y and R-Y digital data are multiplexed alternately in multiplexer 70, thus decreasing the effective sampling rate by a factor of two. The output signal of multiplexer 70 is supplied as data to a FIFO memory 72.

Addressing to identify pixel elements in the slave vidio image is supplied by a counter chain consisting of a horizontal distribution counter 74, a horizontal block address counter 76 and a vertical counter 78. The high speed slave timing clock from the sync and timing circuit 56 is divided down by this counter chain. A frame buffer memory 80, which is too slow to operate at the repetition frequency of the slave timing clock pulse, requires that several bytes of data be accumulated and written in parallel to the frame buffer memory. The horizontal distribution counter 74 provides the addresses which control the distribution of data to buffer registers, such that several bytes can be accumulated before writing that data in the frame memory. The horizontal block address counter 76 is incremented each time a parallel block of bytes is accumulated. The vertical counter 78 is incremented each time a new horizontal line is started. Horizontal and vertical reset pulses are provided from the sync and timing circuit 56 to reset the appropriate counters to zero at the beginning of any horizontal or vertical interval. The address count from each of the counters is provided to respective FIFO memories 82, 84 and 86.

At this time, data and address for pixel elements of the slave signal have been stored in FIFO memory. To understand the timing of the master signal, assume that a composite video signal is applied to a master sync separator and timing circuit 88. This circuit in turn generates master clock pulses which pulse a horizontal distribution counter 90, a horizontal block address counter 92 and a vertical counter 94. The process is the same as occurs in the slave channel.

Data is supplied to the frame buffer memory 80 via the distribution and write registers 96 and 98 under the control of horizontal distribution circuit 100. The data for distribution registers 96 is supplied by FIFO memories 68 and 72, while the address control for the horizontal distribution circuit 100 is derived from FIFO memory 82. The block address for the block of data read into the memory 80 is read into block address register 102 from FIFO memory 84, while the vertical line address is read into vertical address register 104 from FIFO memory 86. Reading of the block of data occurs under control of the master sync and timing circuit 88.

Assuming that data has been properly stored in the frame buffer memory 80, the data is read out of the memory to the read registers 106 as follows: A block of data is read, entirely at one time, from the memory 80 by a block address generated by the horizontal counter 92 and stored in block address register 108 and a vertical line address generated by the vertical counter 94 and stored in vertical address register 110. Again, the read operation, like the write operation, is controlled by the master sync and timing circuit 88. With a block of data in the read register 106, the distribution counter 90 sequentially addresses each byte in the data block and applies it to the appropriate digital-to-analog (D/A) converter, as shown in FIG. 3.

Figure 3:
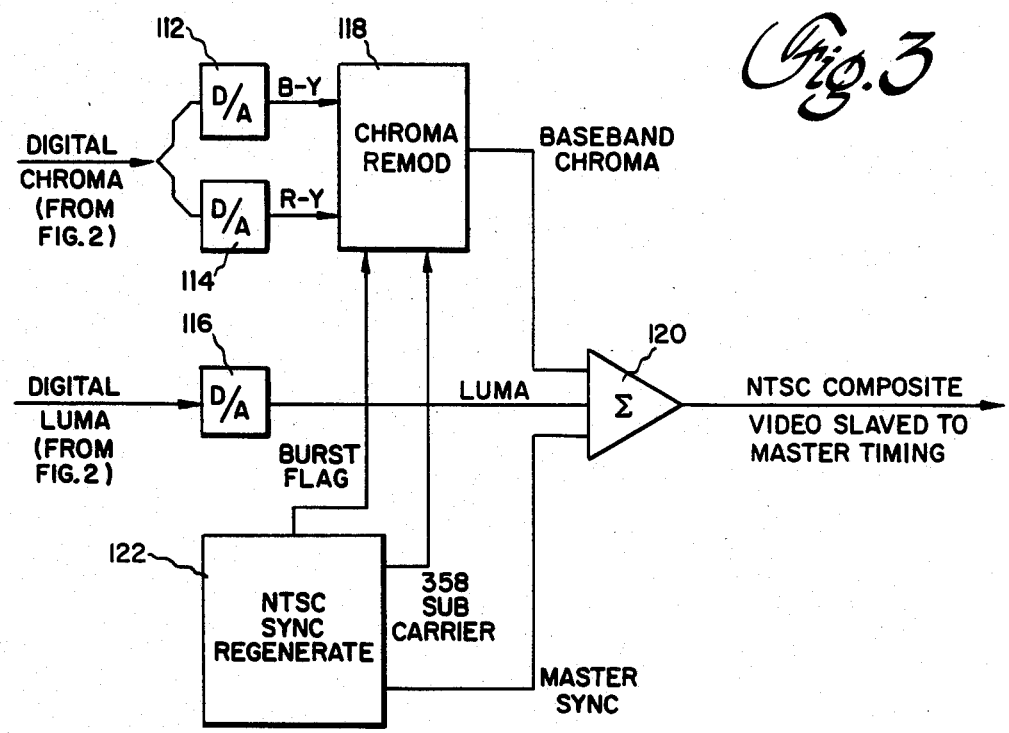
FIG. 3 is a block diagram of an interface circuit for the frame synchronizer shown in FIG. 2 for generating NTSC standard composite video signals for general frame synchronizing applications.

For general applications of the frame synchronizer, output signals of the read register 106 are supplied to the D/A converters 112, 114 and 116 shown in FIG. 3. In the case of the chrominance information, the B-Y and R-Y quadrature components are supplied alternately to the D/A converters 112 and 114 at one half the luminance sampling rate. When the distribution counter 90, shown in FIG. 2, overflows, the horizontal counter 92 is incremented and a new block of data is read from the frame buffer memory 80. In this way, the composite video components of luminance and B-Y and R-Y chrominance are created at the outputs of D/A converters 112, 114 and 116, shown in FIG. 3. The quadrature components B-Y and R-Y are supplied to a chrominance remodulator 118 along with the burst flag and a 3.58 MHz subcarrier signal from an NTSC sync regeneration circuit 122 to produce the chrominance signal at baseband. This signal is supplied to one input of a summing amplifier 120, and the analog luminance signal from D/A converter 116 is supplied to another input of amplifier 120. The master sync signal from the NTSC sync regeneration circuit 122 is supplied to yet another input of summing amplifier 120 thereby completing the synthesis of the NTSC standard composite video signal.

Returning to FIG. 2, it should be remembered that the actual writing of the frame buffer memory is controlled by the master timing while the data to be written is supplied by the slave circuitry. The actual distribution of data to the parallel block registers 96 is controlled by the FIFO memories. Each time data is written in the frame buffer memory 80 from the block data registers 98, the distribution of new data is initiated. The rate of distribution is under control of the FIFO memories. To understand the operation, assume that a start distribution pulse has been received at a distribution flip-flop in the distribution control circuit 100. This start pulse is really just an indication that the last block of data has been written in the frame buffer memory 80. With the distribution flip-flop set, clock pulses are created in distribution control circuit 100 each time all the FIFO memories in the chain have the next element of data ready. The FIFO memory 82 containing the horizontal distribution counter addresses is connected to a decoder (not shown) in the distribution control circuit 100 which sequentially enables the registers of the block data buffer 96. When the last register of the buffer 96 is written, the horizontal counter 76 addresses stored in FIFO 84 and the vertical counter 78 addresses stored in FIFO 86 are loaded into the address buffer registers 102 and 104. In addition, the distribution flip-flop (not shown) in distribution control circuit 100 is reset. Data is then transferred from the block registers 96 to the write registers 98 at the beginning of a frame buffer write cycle. The data and address are then available for the memory write operation. It should be recalled that the beginning of a frame buffer memory write cycle will also set the distribution flip-flop of distribution control circuit 100 and distribution of data can again commence under control of the availability of data in the FIFO memories. It can be seen that data will accumulate in the FIFO memories for as long as the write operation is held off by the master timing circuit 88. In typical operation, at the beginning of each horizontal line, the master timing circuit 88 holds off the write operation for approximately the number of cycles which will half fill the FIFO memories. In this way, proper synchronization between master and slave composite video signals will exist unless the number of sample clock pulses between master and slave differ in one horizontal line time by half the storage capacity, or depth, of the FIFO memory. By combining FIFO memory elements, this memory depth can be expanded to any desired amount.

However, in practical systems, a single FIFO memory which is sixteen elements deep giving plus or minus eight elements of memory is sufficient.

Figure 4:
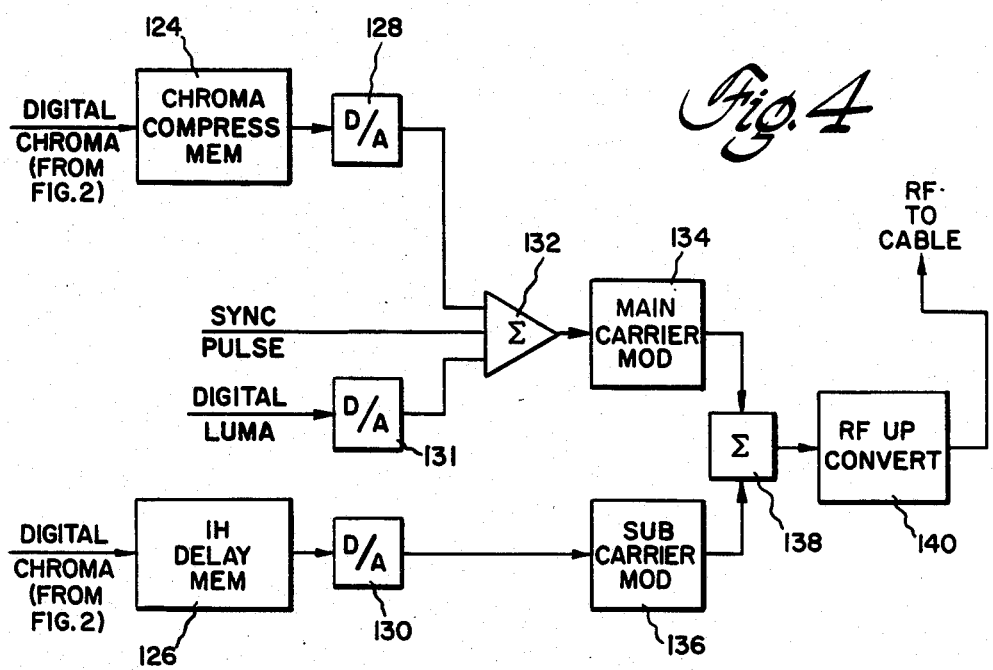
FIG. 4 is a block diagram of an interface circuit for the frame synchronizer shown in FIG. 2 for use in a chrominance time-compressed, luminance bandwidth-reduced television system.

The specific need for this invention arose from the requirement for frame synchronization in the chrominance time-compressed, luminance bandwidth-reduced television system described in application Ser. No. 697,535. In that television system, the chrominance data from the frame buffer memory 80, as shown in FIG. 4, is supplied to a chrominance compression memory 124 and the luminance data is supplied to a one horizontal line delay memory 126. The function of the one horizontal line delay memory 126 is described in detail in the aforementioned application Ser. No. 697,535. The output signals of memories 124 and 126 are supplied to D/A converters 128 and 130, respectively, to generate the corresponding analog chrominance and luminance signals. The output signal of D/A converter 128 is supplied as one input signal to summing amplifier 132. As described in more detail in the aforementioned application Ser. No. 697,535, the digital chrominance signal from a second program source is multiplexed with the digital chrominance signal supplied by the frame synchronizer of FIG. 2, and the multiplexed signals are written into the chrominance compression memory 124. A digital luminance signal from the second program source is supplied by another one horizontal line delay memory (not shown) to a D/A converter 131 to generate the corresponding analog luminance signal. The output signal of D/A converter 131 is also supplied as an input signal to the summing amplifier 132. Also supplied as an input signal to the summing amplifier 132 is a sync pulse. The output signal of the summing amplifier 132 modulates the main carrier IF signal of 45.75 MHz in main carrier modulator 134, while the output signal of D/A converter 130 modulates the subcarrier IF signal 41.25 MHz in subcarrier modulator 136. In other words, the luminance signal from the first program modulates a subcarrier 4.5 MHz removed from the main carrier, while the luminance signal from the second program modulates the main carrier. The output signals from the main carrier modulator 134 and the subcarrier modulator 136 are combined in a signal combiner 138, and the signal thus combined is supplied to an RF up converter 140 from which the signal is transmitted to receiving locations.

This concludes the description of the basic operation of the frame synchronizer according to the present invention. Depending on the system in which it is used, that is whether it is used as a basic frame synchronizer or in the chrominance time-compressed, luminance bandwidth-reduced television system described in application Ser. No. 697,535, the distributed output data from the read registers 106 of FIG. 2 will either be supplied to a signal reconstruction circuit as shown in FIG. 3 or to the interface circuit shown in FIG. 4. In the latter case, the selection of data supplied to the chrominance compression memory 124 is determined by a signal that supplies chrominance information to the memory on every other horizontal line for one program, and on the remaining, alternate horizontal lines for the other program. This is because chrominance information is time-compressed and sent to the receiver for a given program only once every other line. Chrominance information from the other program fills in on the other remaining retrace intervals.

While the invention has been described in terms of two alternative embodiments, those skilled in the art will understand that those embodiments may be modified in detail and form without departing from the spirit and scope of the invention.

What we claim is:

1. A frame synchronizer for use in a television system in which the input and the output sampling rates are different but the output sampling rate is locked to timing pulses associated with a master signal, said frame synchronizer comprising:
   a source of slave composite video signals including chrominance, luminance and synchronization signals;
   chrominance separator means coupled to said source of slave composite video signals for separating the chrominance signal from said slave composite video signals and providing digital representations of said chrominance signal;
   luminance filter means coupled to said source of slave composite video signals for separating the luminance signal from said slave composite video signals and providing digital representations of said luminance signal;
   slave synchronization means coupled to said source of slave composite video signals and responsive to the synchronization signals for providing slave distribution signals and slave horizontal and vertical address signals;
   first-in, first-out memory means respectively coupled to each of said chrominance separator means, said luminance filter means and said slave synchronization means, for temporarily storing said digital representations of chrominance and luminance signals and for temporarily storing said slave distribution signals and said slave horizontal and vertical address signals;
   input register means coupled to said first-in, first-out memory means and responsive to said slave distribution signals for accumulating chrominance and luminance data;
   master synchronization means for providing master distribution signals and master horizontal and vertical address signals and write and read control signals;
   output register means coupled to said master synchronization means and responsive to said master distribution signals for receiving and sequentially reading out digital representations of chrominance and luminance signals; and
   frame buffer memory means coupled between said input and output register means and responsive to said write and read control signals for writing data at addresses corresponding to said slave horizontal and vertical address signals from said input register means and for reading data at addresses corresponding to said master horizontal and vertical address signals to said outer register means in response to the master horizontal and vertical address signals.

2. The frame synchronizer as recited in claim 1 further comprising output means connected to said output register means for generating composite video signals including chrominance, luminance and synchronization signals.

3. The frame synchronizer as recited in claim 1 wherein said chrominance separator means comprises a chrominance demodulator for separating said chrominance signal into quadrature components.

4. The frame synchronizer as recited in claim 2 wherein said chrominance separator means comprises a chrominance demodulator for separating said chrominance signal into quadrature components and said output means includes a chrominance remodulator for combining said quadrature components into a chrominance signal.

5. A method of frame synchronization of a composite video signal including chrominance, luminance and synchronization signals, said method comprising the steps of separating the chrominance, luminance and synchronization signals in said composite video signal, digitizing the separated chrominance and luminance signals, generating slave distribution signals and slave horizontal and vertical address signals from the separated synchronization signal, temporarily storing, in first-in, first-out memories, the digitized chrominance signal and the digitized luminance signal in a first portion of said first-in, first-out memories, the slave distribution signals in a second portion of said first-in, first-out memories and the slave horizontal and vertical address signals in a third portion of said first-in, first-out memories, accumulating chrominance and luminance data from said first portion of the first-in, first-out memories in an input register in response to the slave distribution signals from said second portion of the first-in, first-out memories, generating master distribution and master horizontal and vertical address signals and write and read control signals from a master synchronization signal, writing data from the input register into a frame buffer memory at addresses corresponding to the slave horizontal and vertical address signals in said third portion of the first-in, first-out memories in response to the write control signal, and reading data from addresses corresponding to the master horizontal and vertical address signals from the frame buffer memory to an output register in response to the read control signal.

6. The method of frame synchronization as recited in claim 5 further comprising the steps of sequentially reading out the chrominance and luminance data accumulated in the output register and converting the sequentially read chrominance and luminance data to chrominance and luminance analog signals, and combining the chrominance and luminance analog signals with a synchronizing signal.

7. The method of frame synchronizing as recited in claim 5 wherein the step of separating the chrominance, luminance and synchronization signals comprises the steps of demodulating the chrominance signal into its quadrature components, filtering the luminance signal and sync stripping the synchronization signal.

8. The method of frame synchronizing as recited in claim 6 wherein the step of separating the chrominance, luminance and synchronization signals comprises the steps of demodulating the chrominance signal into its quadrature components, filtering the luminance signal and sync stripping the synchronization signal, and the step of combining the chrominance, luminance and synchronization signals comprises remodulating the quadrature components of the chrominance signal and summing the remodulated chrominance signal and the luminance signal with a synchronization signal to generate a frame synchronized composite video signal.

* * * * *